UNITED STATES PATENT OFFICE.

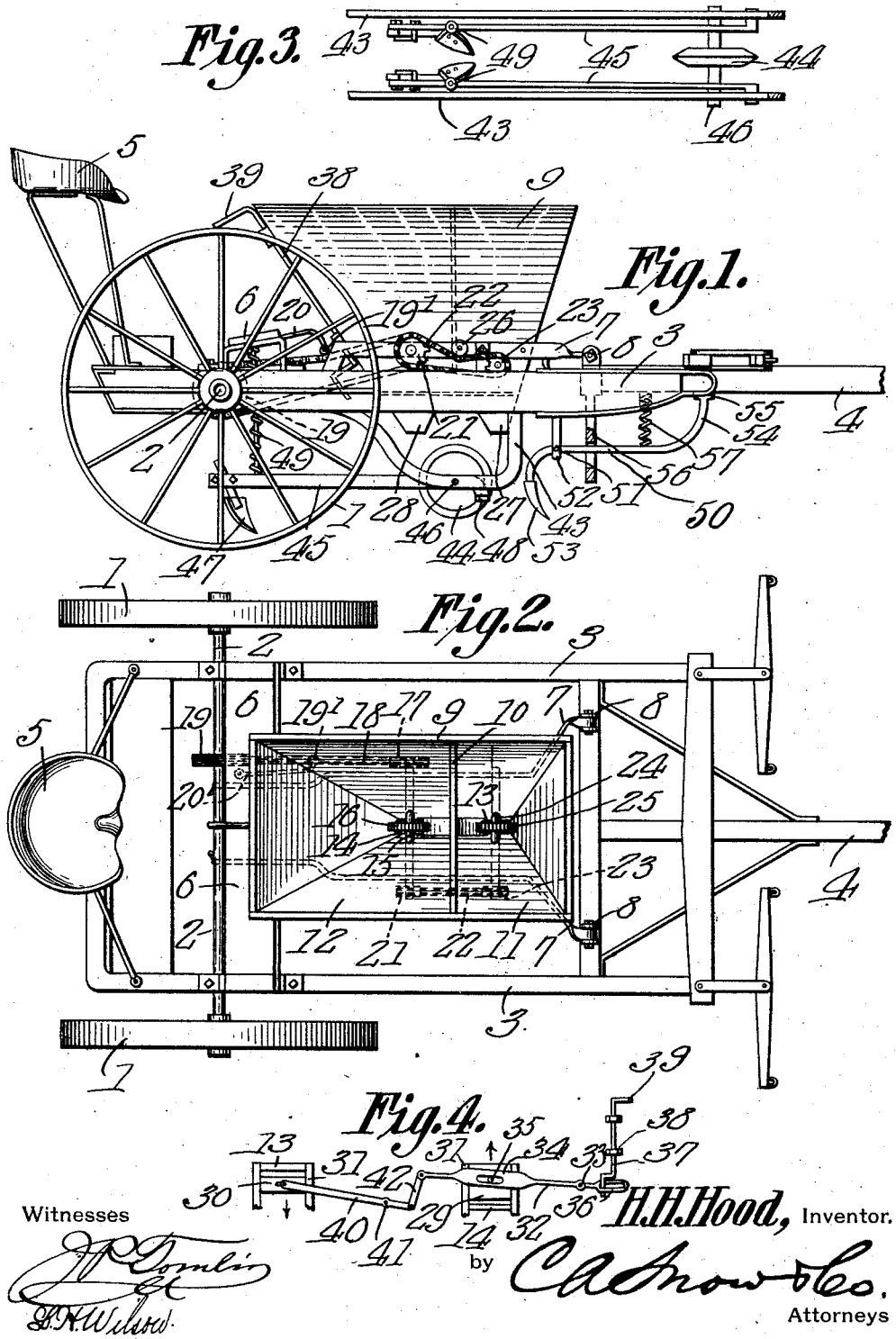

HARVEY HARRISON HOOD, OF CHARLOTTE, NORTH CAROLINA.

COMBINED PLANTER AND FERTILIZER-DISTRIBUTER.

1,048,074.  Specification of Letters Patent.  Patented Dec. 24, 1912.

Application filed June 15, 1912. Serial No. 703,966.

*To all whom it may concern:*

Be it known that I, HARVEY H. HOOD, a citizen of the United States, residing at Charlotte, in the county of Mecklenburg and State of North Carolina, have invented a new and useful Combined Planter and Fertilizer-Distributer, of which the following is a specification.

This invention relates to a combined planter and fertilizer distributer particularly designed for use in planting cotton seed, one of the objects of the invention being to provide a machine of this character including two frames one of which is designed to support the driver while the other frame, which is a "floating" frame, carries the seed boxes and the seed and fertilizer dropping mechanisms.

Another object is to provide a machine of this character which is simple in construction and easy to manipulate the various parts being readily accessible for the purpose of cleaning or repairing them.

Another object is to provide a machine of this type having a furrow opener provided with means whereby the plow point, when brought against an unyielding obstruction, will yield upwardly so as to pass over the obstruction after which the furrow opener will be returned automatically to its initial position.

Another object is to provide improved means for mounting the seed coverers whereby they, too, are free to yield upwardly when necessary.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a side elevation of the machine. Fig. 2 is a plan view thereof. Fig. 3 is a plan view of the seed coverers and the adjacent parts. Fig. 4 is a view, showing in diagram, the means for opening and closing the outlets of the seed and fertilizer boxes.

Referring to the figures by characters of reference 1 designates supporting wheels connected by an axle 2 which is revoluble therewith and which is journaled in or upon the sides of the main frame 3 of the machine. This main frame has a tongue 4 extending forwardly from the front end thereof and a driver's seat 5 is mounted on the rear portion of the frame, there being a foot rest 6 below and in front of the seat and mounted on the frame 3. A "floating" frame 7 is hingedly connected, at its front end, to ears 8 upstanding from the frame 3, and as shown particularly in Figs. 1 and 2, there being a hopper 9 secured to and movable with this frame and divided, by a partition 10, into a fertilizer box 11 and a seed box 12. An outlet 13 is formed in the bottom of the box 11 and another outlet 14 is formed in the bottom of the box 12. A shaft 15 is journaled within the box 12 and extends transversely thereof, this shaft carrying a toothed wheel 16 which is supported close to the outlet 14 and serves to control the discharge of seeds from the box 12. A sprocket 17 is secured to one end of shaft 15 and receives motion, through a chain 18, from a sprocket 19 secured to and rotating with the axle 2. An idler roller 19' bears downwardly upon one flight of the chain 18 and is carried by a spring 20 which is connected to the foot rest 6. This idler thus serves to hold the chain constantly taut. Another sprocket 21 is secured to the shaft 15 and transmits motion, through a chain 22, to a sprocket 23 secured to one end of a shaft 24. This shaft extends transversely through the fertilizer box 11 and has a wheel 25 secured thereto and close to the opening 13 whereby the discharge of fertilizer through the outlet opening 13 is controlled. An idler wheel 26 may be mounted on one side of the hopper so as to engage the chain 22 and hold it taut.

Spouts 27 and 28 extend downwardly from the respective outlet openings 13 and 14 and arranged above these spouts are cut-off slides 29 and 30 respectively mounted within transverse guides 31. A lever 32 is fulcrumed, as at 33, to the back portion of the hopper 9 and the long arm of this lever has a slot 34 slidably engaged by a pin 35 or the like extending from the slide 29 so that, when the lever is swung on its pivot, slide 29 will be shifted to open or close the opening 14. The short arm of lever 32 has a slot 36 engaged by an arm 37 extending radially from the lower end of an upstanding shaft 38, there being an operating handle 39 at the upper end of this shaft whereby the shaft can be rotated and lever 32 thus caused to swing. Another lever 40 is pivotally connected, as at 41, to the bottom portion of the hopper 9 and between the outlets 13 and 14, the long arm of this lever 40 being connected to the slide 30 in the same manner as the long arm of lever 32 is connected to slide 29. The short arm of lever 40 is connected, by means of a link 42, to the long arm of lever 32. Thus it will be seen that, when the slide 29 is shifted in one direction to expose the opening 14 the slide 30 will be shifted in the opposite direction to expose the opening 13. Movement of the slides in the opposite direction will result in the closing of the openings. This arrangement of the parts has been shown in diagram in Fig. 4. It is to be understood that in lieu of the shaft 38 and its parts, any other suitable means may be employed for shifting the levers 32 and 40.

Extending downwardly from the front portion of the frame 7 is a supplemental frame 43 the sides of which not only extend downwardly but also extend rearwardly and thence upwardly to the frame 7. A furrow wheel 44 is journaled within this frame 43 and interposed between the sides of the frame and the sides of the furrow wheel are rearwardly extending beams 45 which are pivotally mounted on the axle 46 of wheel 44 and carrying, at their rear ends, seed coverers 47 of any preferred form. The beams 45 extend forwardly beyond the axle 46 and have stop projections 48 which extend under the sides of frame 43 so as to limit the downward movement of the coverers 47. Springs 49 bear downwardly on the respective beams 45 and are secured, at their upper ends, to the foot rest 6. Thus it will be seen that the seed coverers are held loosely in contact with the soil but, after moving downwardly a predetermined distance relative to the frame 43, will be held against further movement by the stops 48 coming upwardly against the sides of frame 43.

The furrow opener 43 is located in front of the wheel 44 and includes a beam 50 pivotally connected, as at 51, to a hanger 52 extending downwardly from the front end of the main frame 3. A plow 53 is connected to the rear end of the beam while the forward end of the beam is curved upwardly, as at 54 and terminates in a head 55 which normally bears upwardly against the tongue 4. A guide 56 extends downwardly from the frame 3 and the beam 50 extends through this guide and is held against lateral swinging by it. A spring 57 is interposed between tongue 4 and beam 50 and pulls upwardly on the beam. This, obviously, holds the head 55 normally against the tongue 4. If, however, the plow 53 should strike an unyielding obstruction, the forward end of the beam 50 would swing downwardly, thereby elongating spring 57. During this downward swinging movement the plow 53 would swing rearwardly and upwardly and, after passing over the obstruction, would be returned to normal position by the spring 57.

When the machine is drawn forward, the operator occupies seat 5 and it is not necessary for him to undergo the fatigue of walking over newly plowed ground. By shifting the shaft 38 the slides 29 and 30 can be moved so as to partly or entirely open the outlets of the two boxes. The plow 53 will operate to open the furrow and the rotating wheels 25 and 16 will drop the fertilizer and the seeds into the furrow after which the coverers 47 will direct soil back into the furrows. As the arm 39 extends within convenient reach of the occupant of seat 5, it will be seen that the discharge of fertilizer and seeds is constantly under the control of the operator. The furrow opener will act automatically to pass over obstructions, in the manner hereinbefore described and, by providing covering blades 47 mounted in the manner shown and described, the blades will yieldingly engage the soil and will also be free to pass over any obstructions in the paths thereof.

What is claimed is:—

1. A machine of the class described including a wheel supported main frame, a frame hinged, at its front end, thereto and adapted to swing upwardly and downwardly within the main frame, a hopper carried by the hinged frame, dropping mechanism within the hopper, means operated by the movement of the supporting wheels for actuating said mechanism, a supplemental frame connected to and extending under the hinged frame, a furrow wheel journaled therein, seed coverers connected to said supplemental frame and movable relative thereto, and a furrow opener carried by the main frame and in front of the furrow wheel.

2. A machine of the class described including a wheel supported main frame, a hinged frame therein, dropping mechanism movable with the hinged frame, a supplemental frame movable with said hinged frame and extending thereunder, a furrow wheel journaled within the supplemental frame, beams pivotally connected to the supplemental frame, seed coverers carried thereby, and means for pressing said coverers yieldingly into contact with the soil.

3. A machine of the class described including a wheel supported main frame, a hinged frame therein, dropping mechanism movable with the hinged frame, a supplemental frame movable with said hinged frame and extending thereunder, a furrow wheel journaled within the supplemental frame, beams pivotally connected to the supplemental frame, seed coverers carried thereby, means for pressing said coverers yieldingly into contact with the soil, and means upon the beams and coöperating with the supplemental frame, for limiting the downward movement of the seed coverers.

4. A machine of the class described including a wheel supported main frame, a hinged frame therein, a hopper carried by the hinged frame, a supplemental frame connected to the hinged frame and extending thereunder, a furrow wheel journaled within the supplemental frame, seed coverers supported back of the furrow wheel, and a furrow opener connected to the main frame and in front of the furrow wheel, said furrow opener including a beam pivotally mounted between its ends, a plow at the rear end of the beam, means upon the main frame and normally contacted by the other end of the beam for limiting the downward movement of the plow, and means for holding said beam yieldingly in normal position.

In testimony that I claim the foregoing as my own, I have hereto affixed my signature in the presence of two witnesses.

HARVEY HARRISON HOOD.

Witnesses:
J. B. POWELL,
R. C. ROSS.

---

Copies of this patent may be obtained for five cents each, by addressing the "Commissioner of Patents, Washington, D. C."